(12) United States Patent
Chow et al.

(10) Patent No.: US 11,030,377 B1
(45) Date of Patent: Jun. 8, 2021

(54) ROUTING BASED ON PIN PLACEMENT WITHIN ROUTING BLOCKAGE

(71) Applicant: Cadence Design Systems, Inc., San Jose, CA (US)

(72) Inventors: Wing-Kai Chow, Austin, TX (US); Mehmet Can Yildiz, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/895,847

(22) Filed: Jun. 8, 2020

(51) Int. Cl.
*G06F 30/394* (2020.01)
*G06K 9/62* (2006.01)

(52) U.S. Cl.
CPC .......... *G06F 30/394* (2020.01); *G06K 9/623* (2013.01); *G06K 9/6259* (2013.01)

(58) Field of Classification Search
CPC .................................................. G06F 30/394

USPC ........................................................ 716/126
See application file for complete search history.

(56) References Cited

U.S. PATENT DOCUMENTS 9,558,313 B1 * 1/2017 Siddiqi ................. G06F 30/394

* cited by examiner

*Primary Examiner* — Eric D Lee
(74) *Attorney, Agent, or Firm* — Schwegman Lundberg & Woessner, P.A.

(57) ABSTRACT

Various embodiments described herein provide for routing of wires of a network of a circuit design based on pin placement within a routing blockage. In particular, various embodiments provide a routing solution for a circuit design with zero blockage violation when there is no pin inside routing blockage of the circuit design, and uses a parameter (e.g., an adjustable parameter) that controls accuracy at which a routing process handles a pin (e.g., as placed by a placement stage) in routing blockage of the circuit design. For example, the parameter can control how much detour is acceptable when handling routing for a pin inside a routing blockage.

20 Claims, 11 Drawing Sheets

US 11,030,377 B1

ROUTING BASED ON PIN PLACEMENT WITHIN ROUTING BLOCKAGE

TECHNICAL FIELD

Embodiments described herein relate to circuit design and, more particularly, to systems, methods, devices, and instructions for routing of wires of a network of a circuit design based on pin placement within a routing blockage, which may be part of electronic design automation (EDA).

BACKGROUND

Electronic design automation (EDA) is a category of systems for assisting with the design of electronic systems and devices. Traditional EDA systems include performing routing connection paths between two or more pins of a circuit design, which attempts to create connections with minimal path length while trying to ensure that connection paths do not cross routing blockages of the circuit design (e.g., as defined by one or more constraints of the circuit design). Based on routing results, metal wires can be used to connect pins of the circuit design and wire length, congestion and time estimation can be determined (e.g., during a placement stage).

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
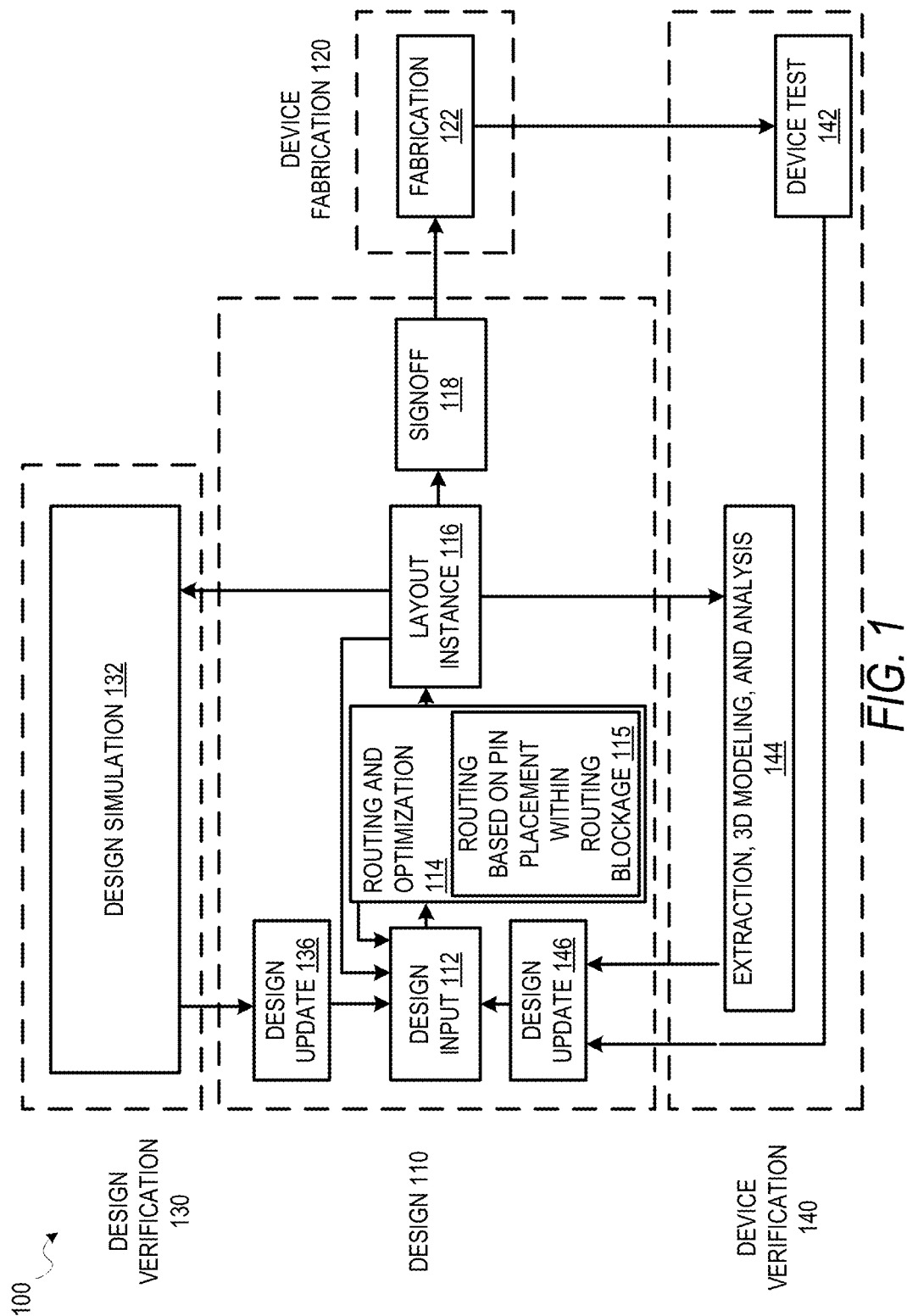
FIG. 1 is a diagram illustrating an example design process flow for routing of wires of a network of a circuit design based on pin placement within a routing blockage, according to some embodiments.

Traditionally, during early circuit design stages (e.g., during a placement stage), the placement of circuit design component instances (e.g., IP blocks) and pins have not been completed yet. As a result, a pin has a chance of being placed inside a routing blockage of a circuit design, which can lead to a traditional routing methodology providing a routing solution that includes one or more blockage violations. A user (e.g., circuit design engineer) generally desires a reasonable routing solution that minimizes blockage violations and total wire length of a circuit design, which can facilitate accurate estimation of wire length, congestion, and timing of a circuit design.

Conventional routing methodologies usually comprise a conventional maze routing algorithm that uses two phases to find a shortest path, where one or more grid nodes are used to store intermediate score information for path finding, where one or more grid edges (each having an edge weight) are used to connect neighboring grid nodes, and where the first phase comprises score propagation and the second phase comprises a path trace back. At the beginning, the conventional maze routing algorithm can define one of the end point pin as a source node, can define another end point pin as a target node, and can initialize score of the source node to 0. During score propagation phase, a grid node with a lowest score S, and which that has not propagated this score S to its neighbor grid nodes, can propagate the score S to the neighbor grid nodes with its score plus the edge weight U (e.g., S+U)—as follows: if the neighbor grid node does not have an existing score, the score S+U will be propagated to the neighbor grid node; if the neighbor grid node already has an existing score, and S+U is lower than that existing score, the lower score will replace the old score; and if the neighbor grid node already has an existing score, and S+U is equal or higher than that existing score, the propagation is not performed. Eventually, when the score propagation stage reaches the target node, an optimal path can be traced with the score values in the grid graph. To handle routing blockages, grid edges that are blocked can be associated with a weight of infinity: (a) by not performing score propagation along the blocked grid edge; or (b) by associating the blocked gird edge with a large number. To handle pins inside blockages, the conventional maze routing algorithm of method (a) cannot give any routing solution, and the conventional maze routing algorithm of method (b) will give a routing solution with minimal blockage violations as long as the large number does not cause any memory issue in actual implementation (e.g., the limitation of maximum number can be stored in a 32-bit integer is $2^{32}$, which is around 4.2 billion).

Unfortunately, when a pin is inside a routing blockage (e.g., placed there by a placement stage), the conventional maze routing algorithm ends up exploring all non-blocking regions before start searching the routing blockage. Additionally, when the routable region of a circuit design is quite large, the conventional maze routing algorithm can consume a large amount of time even if two pins are actually very close to each other.

Various embodiments described herein provide for routing of wires of a network of a circuit design based on pin placement within a routing blockage, which may be part of electronic design automation (EDA). The routing of some embodiments can avoid routing blockages and can handle a pin inside a routing blockage (e.g., as placed by a placement stage). According to some embodiments, the routing provides (for a circuit design) a routing solution with zero blockage violation when there is no pin inside a routing blockage, and the routing uses a parameter (e.g., an adjustable parameter) that controls accuracy at which the routing handles a pin (e.g., as placed by a placement stage) in routing blockage of the circuit design. For example, the parameter can control how much detour is acceptable when handling routing for a pin inside a routing blockage.

Some embodiments are implemented using a maze routing algorithm that associates different scores for: propagation into a routing blockage, which can be referred to herein as a score I; propagation within a routing blockage, which can be referred to herein as a score B; propagation out of a routing blockage, which can be referred to herein as a score O; and propagation outside of a routing blockage, which can be referred to herein as a score U. By using these scores, various embodiments can avoid associating a high weight for all blocked routing edges. According to some embodiments, the score setting strategy used comprises U≤I=B<<O, which means that U is smaller than or equal to I or B, and O is much higher than any of U, I, or B. By using such a scoring strategy, some embodiments can reach pins inside a routing blockage by propagation much faster than conventional routing methodologies.

In comparison to some embodiments, conventional maze routing algorithms typically use the same score for propagating into a routing blockage, propagating within a routing blockage, and propagating out of a routing blockage, and typically use a score for propagating outside a routing blockage that is much smaller than propagating into, within, or out of a routing blockage.

Routing by some embodiments does not result in routing blockage violations if no pins are inside a routing blockage (e.g., have not been placed inside a routing blockage by a placement stage).

For some embodiments, if a source pin is inside a routing blockage and a target pin is inside a routing blockage, special value propagation is used (e.g., because the propagation process cannot propagate out of the routing blockage blockage). For example, when a source pin is inside a routing blockage, scores (e.g., values) propagated from the source pin can be associated with a special label (e.g., label s), thereby resulting in labeled scores. For example, when a source pin is inside a routing blockage, scores (e.g., values) propagated from the source pin can comprise a numerical score value that is concatenated by the special label (e.g., label s). For some embodiments, if a labeled score propagates inside a routing blockage, score B is applied and the score propagated is also labeled. For some embodiments, if a labeled score propagates out of a routing blockage, score B (e.g., instead of score O) is applied and the special label can be removed. Adjusting or setting one or more of the scores described herein, such as one of a unit score U, an inside-routing-blockage score B, or an exiting-routing-blockage score O, can represent using a parameter that controls accuracy at which a routing process of various embodiments handles a pin (e.g., as placed by a placement stage) in routing blockage of the circuit design.

Use of various embodiments provide for routing with an adjustable parameter to control blockage handling accuracy. Some embodiments can be implemented as a maze routing algorithm runtime, where the number of propagations performed by the algorithm is not affected much with area of routing blockage and the number of propagations performed by the algorithm is not significantly affected with pins inside a routing blockage or close to the boundary of a routing blockage. In comparison to conventional technologies, various embodiments described herein can have a lower run time to connect a pin (e.g., that has been placed by a placement stage) inside a routing blockage.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for routing of wires of a network of a circuit design based on pin placement within a routing blockage, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. The routing and optimization 114 operation may also include other operations not shown, such as those relating to floorplanning, placement, post-placement optimization, and post-routing optimization. As shown, the routing and optimization 114 operation includes a routing based on pin placement within a routing blockage 115 operation (hereafter, the pin-placement-based routing 115 operation), which may be performed in accordance with various embodiments described herein. For some embodiments, the pin-placement-based routing 115 operation can be performed prior to detailed routing of a circuit design, after global routing of the circuit design or after layer assignment of the circuit design.

While the design process flow 100 shows optimization occurring prior to a layout instance 116, timing analysis and optimization may be performed at any time to verify operation of a circuit design. For instance, in various embodiments, timing analysis in a circuit design may be performed prior to routing of connections in the circuit design; after routing, during register transfer level (RTL) operations; or as part of a signoff 118, as described below.

Design inputs are used in the design input 112 operation to generate an initial circuit layout. The design inputs may be further processed during the design input 112 operation via a process, such as logic-synthesis to generate a circuit netlist mapped to a target standard library manufacturable by the foundry in a fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations and layout modifications generated based on actual device performance.

As described in more detail below, a design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
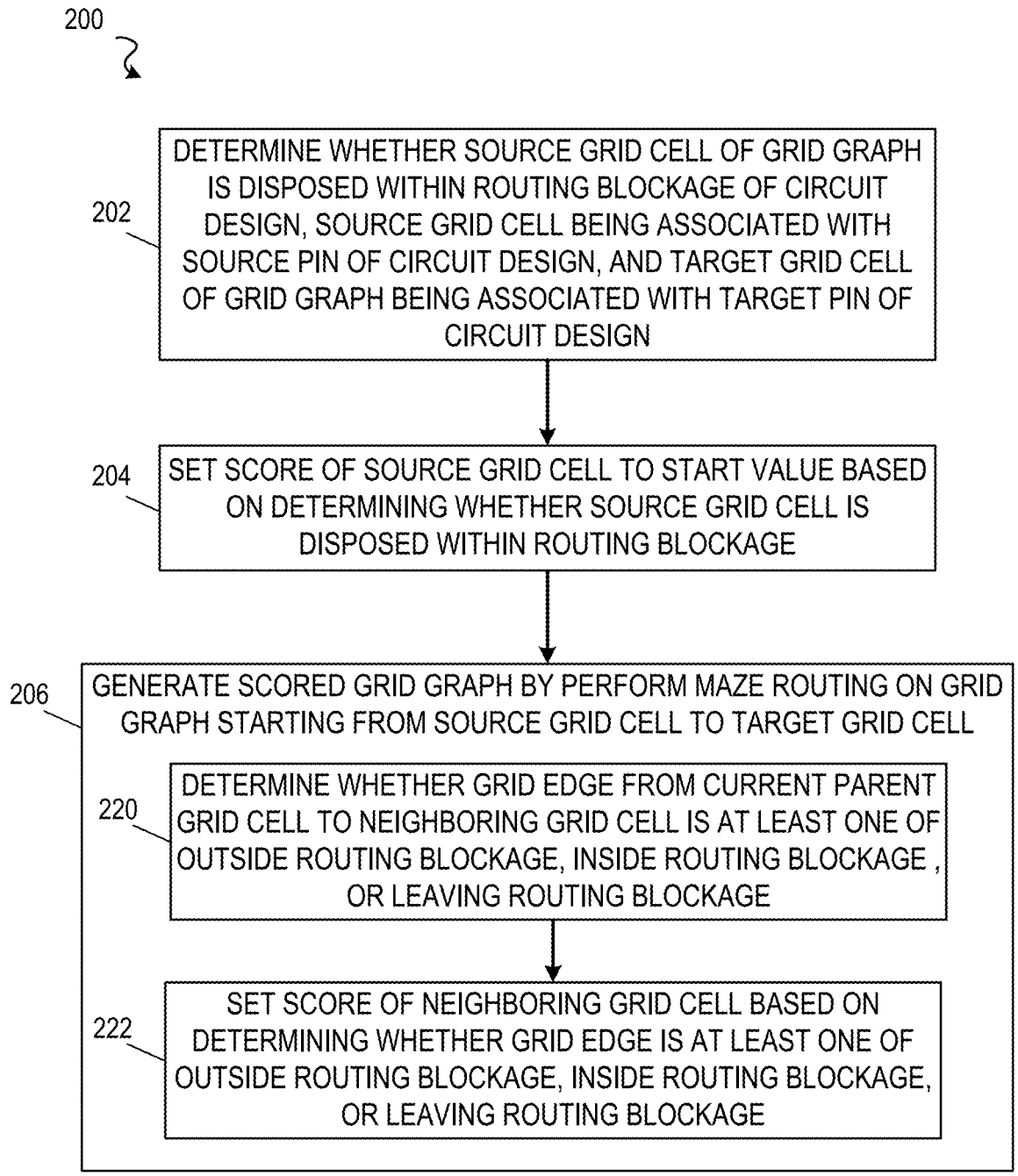
FIGS. 2 through 4 are flowcharts illustrating example methods for routing of wires of a network of a circuit design based on pin placement within a routing blockage, according to some embodiments.
Figure 3:
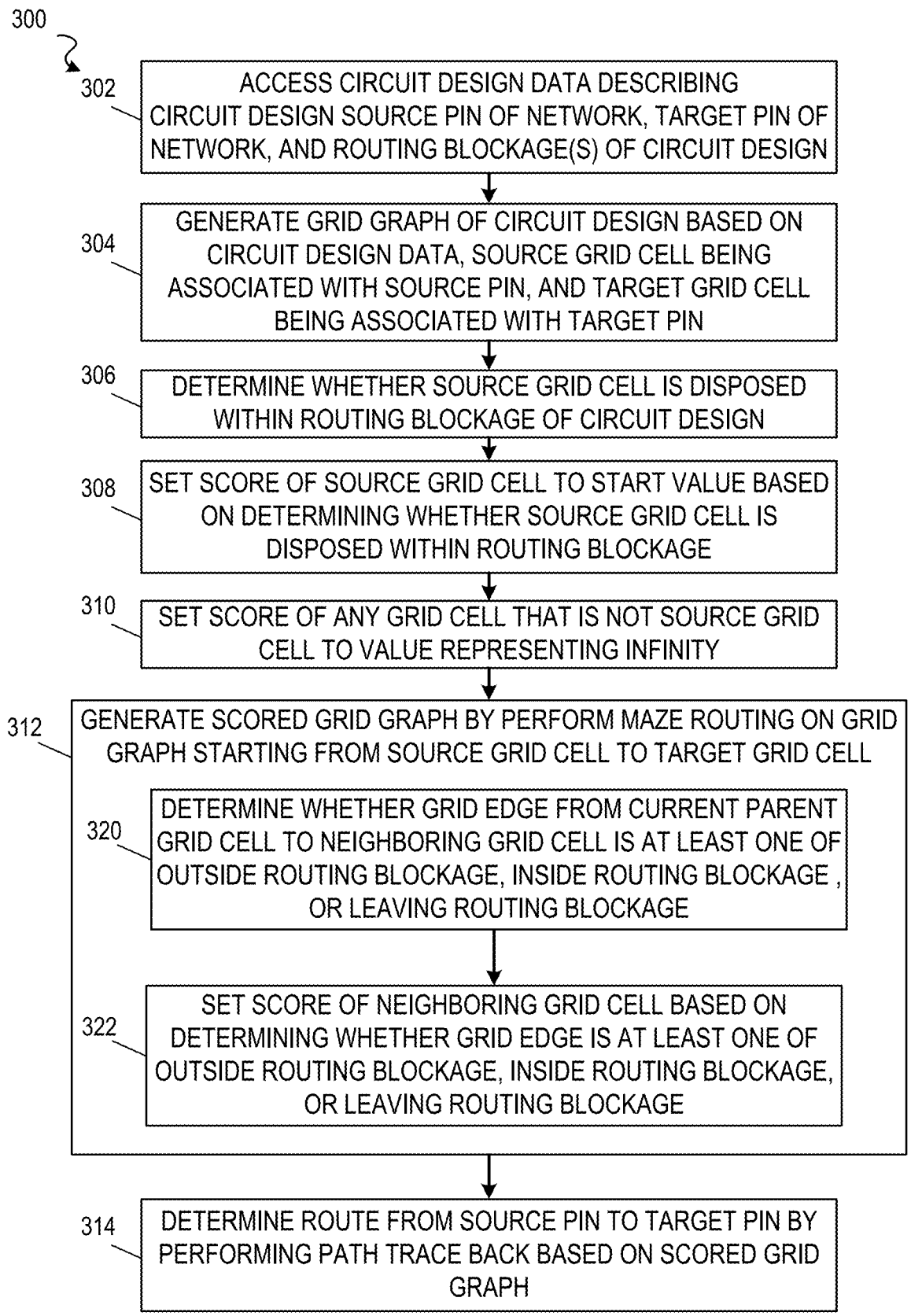

FIGS. 2 and 3 are flowcharts illustrating example methods for routing of wires of a network of a circuit design based on pin placement within a routing blockage, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, for some embodiments, one or more operations of a method 200 are performed as part of a routing process performed with respect to a circuit design (e.g., by an EDA software system), such as an early routing process used to provide a routing solution for estimating wire length, congestion, and timing within a circuit design. Such an early routing process may be, for example, performed prior to placement being completed (e.g., performed as part of a placement stage process). An operation of the method 200 (or another method described herein) may be performed by a hardware processor (e.g., central processing unit or graphics processing unit) of a computing device (e.g., desktop, server, etc.).

As illustrated, operation 202 determines whether a source grid cell, of a plurality of grid cells of a grid graph of a circuit design, is disposed (e.g., placed) within routing blockage of the circuit design, where the source grid cell is associated with a source pin of the circuit design, and where a target grid cell of the plurality of grid cells of the circuit design is associated with a target pin of the circuit design.

Thereafter, operation 204 set a score of the source grid cell to a start value based on determining (at operation 202) whether the source grid cell is disposed within routing blockage of the circuit design. For some embodiments, operation 204 comprises responding to determining that the source grid cell is disposed within routing blockage of the circuit design by setting the score of the source grid cell to a numerical value (e.g., zero value) with a special label (e.g., where the label comprises the letter 's' added as a suffix to the numerical value). Additionally, for some embodiments, operation 204 comprises responding to determining that the source grid cell is not disposed within routing blockage of the circuit design by setting the score of the source grid cell to a numerical value (e.g., zero value) without a special label.

Next, operation 206 generates a scored grid graph by performing maze routing on the grid graph starting from the source grid cell to the target grid cell. As shown, operation 206 comprises performing operations 220 through 222, which performs the maze routing. Operation 220 determines whether a grid edge from a current parent grid cell to a neighboring grid cell is at least one of: outside routing blockage of the circuit design; inside routing blockage of the circuit design; or exiting routing blockage of the circuit design.

Operation 222 sets a score of the neighboring grid cell based on determining (at operation 220) whether the grid edge from the current parent grid cell to the neighboring grid cell is at least one of outside routing blockage of the circuit design, inside routing blockage of the circuit design, or exiting routing blockage of the circuit design. Depending on the embodiment, operation 222 can comprise setting a score of a neighboring grid cell based on a first score in response to determining that the grid edge is outside routing blockage of the circuit design. For instance, setting the score of the neighboring grid cell based on the first score can comprise setting the score of the neighboring grid cell based on the first score and the score of the current parent grid cell. Depending on the embodiment, operation 222 can comprise setting the score of the neighboring grid cell based on a second score in response to determining that the grid edge is inside routing blockage of the circuit design. For instance, setting the score of the neighboring grid cell based on the second score can comprise setting the score of the neighboring grid cell based on the second score and the score of the current parent grid cell. Additionally, in response to determining that the grid edge is exiting routing blockage of the circuit design, operation 222 can comprise: determining whether a score of the current parent grid cell comprises the special label; and setting, based on determining whether the score of the current parent grid cell comprises the special label, the score of a neighboring grid cell based on at least one of the second score or a third score. For instance, setting the score of the neighboring grid cell based on the third score can comprise setting the score of the neighboring grid cell based on the third score and the score of the current parent grid cell.

For some embodiments, setting the score of the neighboring grid cell based on at least one of the second score or the third score (based on determining whether the score of the current parent grid cell comprises the special label) comprises setting the score of the neighboring grid cell based on the second score in response to determining that the score of the current parent grid cell comprises the special label. Alternatively, setting the score of the neighboring grid cell based on at least one of the second score or the third score (based on determining whether the score of the current parent grid cell comprises the special label) can comprise setting the score of the neighboring grid cell based on the third score in response to determining that the score of the current parent grid cell does not comprise the special label. According to some embodiments, the third score is greater than the second score, and the second score is greater than the first score.

Referring now to FIG. 3, for some embodiments, one or more operations of a method 300 are performed as part of a routing process performed with respect to a circuit design (e.g., by an EDA software system), such as an early routing process used to provide a routing solution for estimating wire length, congestion, and timing within a circuit design. Such an early routing process may be, for example, performed prior to placement being completed (e.g., performed as part of a placement stage process). An operation of the method 300 (or another method described herein) may be performed by a hardware processor (e.g., central processing unit or graphics processing unit) of a computing device (e.g., desktop, server, etc.).

As illustrated, at operation 302, circuit design data is accessed, where the design data describes a source pin of a network of a circuit design, a target pin of the network of the circuit design, and a set of routing blockages of the circuit design. Subsequently, operation 304 generates a grid graph of the circuit design based on the circuit design data. For various embodiments, the grid graph comprises a plurality of grid cells, with a source grid cell of the plurality of grid cells being associated with the source pin, and with a target grid cell of the plurality of grid cells being associated with the target pin.

The method 300 continues with operations 306 and 308, which according to various embodiments, are respectively similar to operations 202 and 204 described above with respect to the method 200 of FIG. 2. At operation 310, a score of any grid cell that is not the source grid cell is set to a value (e.g., a numerical value) representing infinity.

The method 300 continues with operation 312 generating a scored grid graph by performing maze routing on the grid graph starting from the source grid cell to the target grid cell. As shown, operation 312 comprises operations 320 and 322, which according to various embodiments, are respectively similar to operations 220 and 222 described above with respect to the method 200 of FIG. 2.

Eventually, at operation 314, a route is determined, from the source pin to the target pin, by performing a path trace back based on the scored grid graph. For some embodiments, the path track back comprises a method similar to method 500 described herein with respect to FIG. 5.

Figure 4:
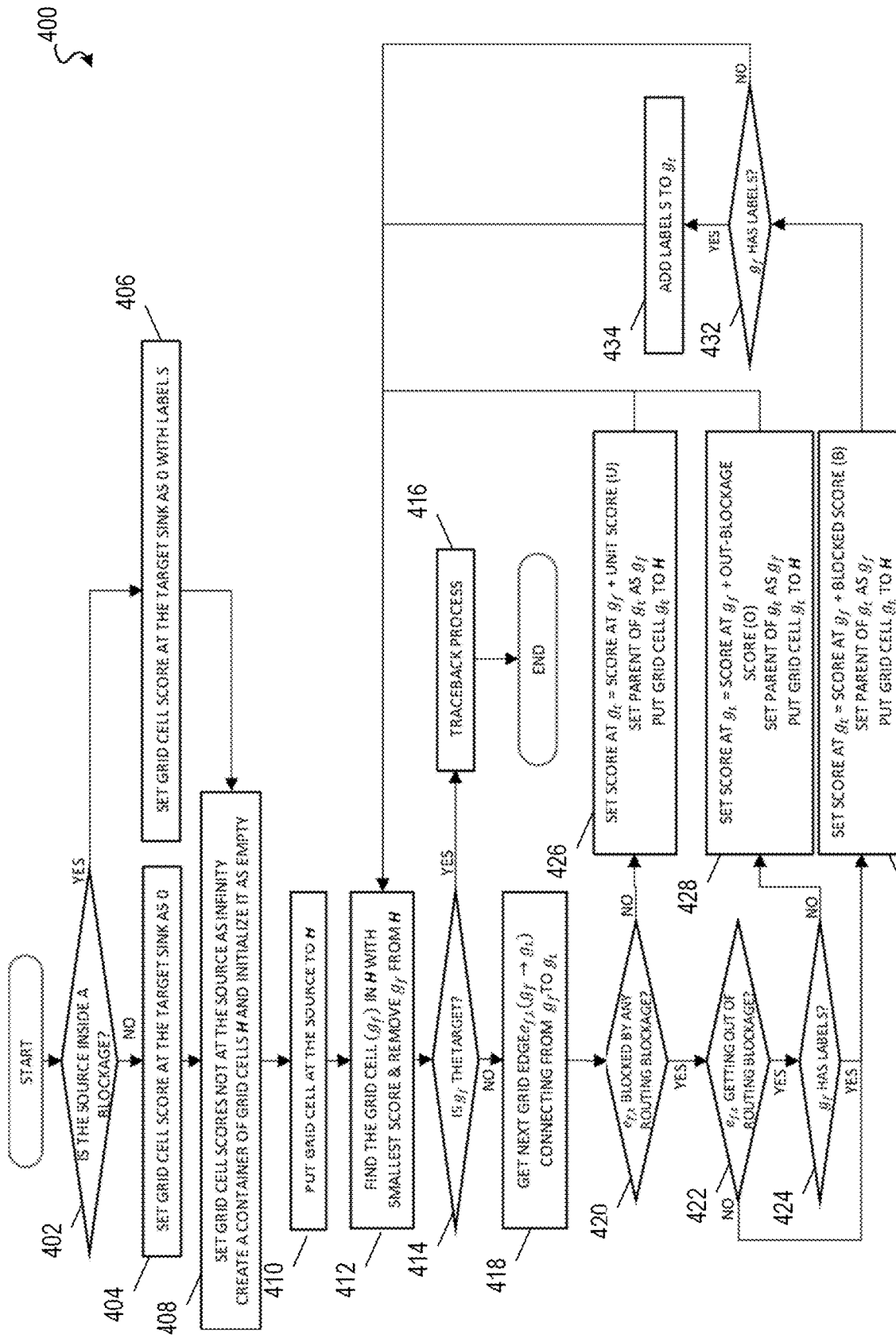

Referring now to FIG. 4, for some embodiments, one or more operations of a method 400 are performed as part of a routing process performed with respect to a circuit design (e.g., by an EDA software system), such as an early routing process used to provide a routing solution for estimating wire length, congestion, and timing within a circuit design. Such an early routing process may be, for example, performed prior to placement being completed (e.g., performed as part of a placement stage process). An operation of the method 400 (or another method described herein) may be performed by a hardware processor (e.g., central processing unit or graphics processing unit) of a computing device (e.g., desktop, server, etc.).

At the start, operation 402 determines whether a source grid cell (the source) associated with a source pin (of a network of a circuit design) is inside a routing blockage. If yes, the method 400 continues to operation 406, otherwise the method 400 proceeds to operation 404. At operation 404, a grid cell score at a target grid cell (the target sink) associated with a target pin of the network is set to 0. After operation 404 or operation 406, the method 400 continues with operation 408 setting the grid cell scores of grids not at the source grid cell to infinity, and creating a container of grid cells H that is initialized as empty. Subsequently, operation 410 puts (e.g., positions) the container H to the source grid cell. Thereafter, at operation 412, a grid cell $g_f$ having the smallest score is found in the container H and remove grid cell gr from the container H.

At operation 414, if it is determined that the grid cell $g_f$ is the target grid cell, the method 400 proceeds to operation 416, otherwise the method 400 proceeds to operation 418. Operation 416 performs a traceback process (a path trace back) to generate a route or route solution from the source grid cell (associated with the source pin) to the target grid cell (associated with the target pin). After operation 416, the method 400 ends. For some embodiments, the traceback process can be similar to method 500 described with respect to FIG. 5.

Operation 418 gets (e.g., obtains) a next grid edge $e_{f,t}$ ($g_f \rightarrow g_t$) connecting from grid cell $g_f$ to a neighboring grid cell $g_t$. Next, if it is determined at operation 420 that the next grid edge $e_{f,t}$ is block by any routing blockage, the method 400 proceeds to operation 422, otherwise the method 400 proceeds to operation 426. At operation 422, if it is determined that the next grid edge $e_{f,t}$ is getting out of (exiting) routing blockage, the method 400 proceeds to operation 424, otherwise the method 400 proceeds to operation 430. At operation 424, if it is determined that grid cell g comprises a special label s (meaning that the source pin is placed within routing blockage), the method 400 proceeds to operation 430, otherwise the method 400 proceeds to operation 428.

Operation 426 sets a score of the neighbor grid cell $g_t$ equal to the grid score of grid cell $g_f$ plus a unit (e.g., outside-of-routing-blockage) score U, sets grid cell $g_f$ as the parent of the neighbor grid cell $g_t$, and puts the neighbor grid cell gi to the container H. From operation 426, the method 400 proceeds back to operation 412. Operation 428 sets a score of the neighbor grid cell $g_t$ equal to the grid score of grid cell $g_f$ plus an out-blockage (e.g., exiting-out-of-routing-blockage) score O, sets grid cell $g_f$ as the parent of the neighbor grid cell gr, and puts the neighbor grid cell $g_t$ to the container H. From operation 428, the method 400 proceeds back to operation 412.

Where the method 400 proceeds to operation 430, operation 430 sets a score of the neighbor grid cell $g_t$ equal to the grid score of grid cell $g_f$ plus a blocked (e.g., inside-routing-blockage) score B, sets grid cell $g_f$ as the parent of the neighbor grid cell $g_t$, and puts the neighbor grid cell gr to the container H. The method 400 then proceeds to operation 432. If at operation 432 it is determined that the score of grid cell $g_f$ comprises the special label s, the method 400 proceeds to operation 434, otherwise the method 400 proceeds back to operation 412. At operation 434, the special label s to the score of the neighbor grid cell gr. From operation 434, the method 400 proceeds back to operation 412.

Figure 5:
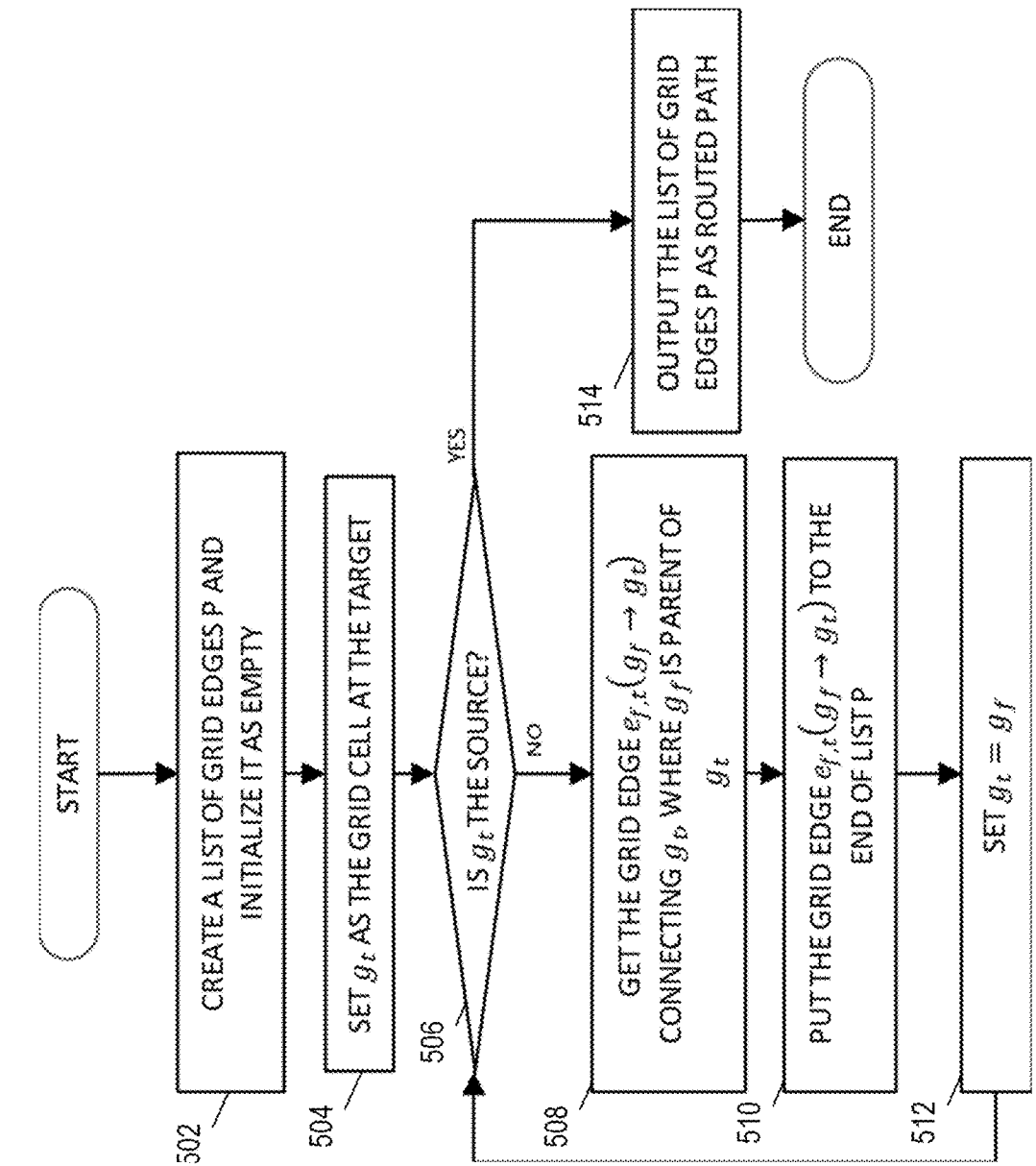
FIG. 5 is a flowchart illustrating an example method for path trace back that can be used by, or in conjunction with, some embodiments.

FIG. 5 is a flowchart illustrating an example method 500 for path trace back that can be used by, or in conjunction with, some embodiments. For some embodiments, one or more operations of a method 500 are performed as part of a routing process performed with respect to a circuit design (e.g., by an EDA software system), such as an early routing process used to provide a routing solution for estimating wire length, congestion, and timing within a circuit design. Such an early routing process may be, for example, performed prior to placement being completed (e.g., performed as part of a placement stage process). An operation of the method 500 (or another method described herein) may be performed by a hardware processor (e.g., central processing unit or graphics processing unit) of a computing device (e.g., desktop, server, etc.).

Referring now to FIG. 5, starting at operation 502, a list of grid edges P is created and initialized as empty. At operation 504, grid cell $g_t$ is set as the target grid cell associated with a target pin of a network of a circuit design. Next, at operation 506, if grid cell gr is determined to be the source grid cell associated with a source pin of the network, the method 500 proceeds to operation 514, otherwise the method 500 proceeds to operation 508.

At operation 508, a grid edge $e_{f,t}(g_f \rightarrow g_t)$ connecting to the grid cell $g_t$, where the grid cell $g_f$ is a parent grid cell of the grid cell $g_t$. Operation 510 puts (e.g., disposes) the grid edge $e_{f,t}(g_f \rightarrow g_t)$ to the end of the list of grid edges P. Then, operation 512 sets the grid cell $g_f$ as the grid cell $g_t$. After operation 512, the method 500 proceeds back to operation 506.

Eventually, operation 514 outputs the list of grid edges P as a routed path, which can represent a route from the source pin to the target pin. After operation 514, the method 500 ends.

Figure 6:
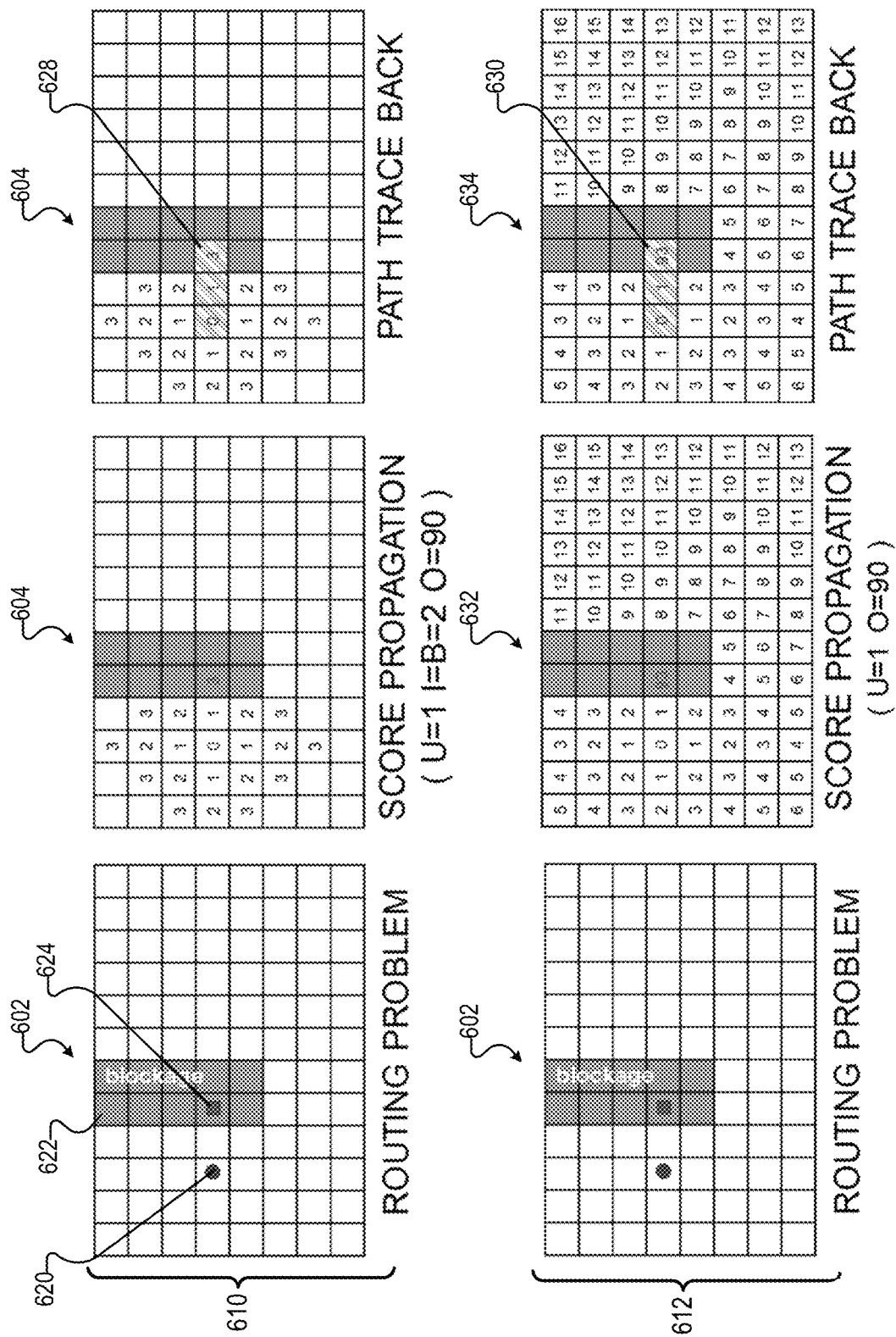
FIGS. 6 through 9 illustrate examples of applying methods described herein to example routing problems, according to some embodiments.

FIGS. 6 through 9 illustrate examples of applying methods described herein to example routing problems, according to some embodiments. Referring now to FIG. 6, label 610 refers to an application of a method for routing, according to some embodiments, to an example routing problem illustrated by grid graph 602. For the sake of comparison, label 612 refers to application of a traditional method of routing to the example routing problem by the grid graph 602. As shown, the grid graph 602 comprises a source grid cell 620 associated with a source pin of a network of a circuit design, a target grid cell 624 associated with a target pin of the network, and plurality of grid cells 622 associated with a routing blockage of the circuit design. The grid graph 602 represents the example routing problem for routing from the source grid cell 620 to the target grid cell 624, where the source pin is placed outside routing blockage and the target pin is placed inside routing blockage.

A grid graph 604 represents application of an example method of an embodiment based on a unit score U of 1, an inside-blockage score B of 2, and an exiting-blockage score O of 90. As shown, the method for routing (according to some embodiments) performs 20 score propagations from the source grid cell 620 before reaching the target grid cell 624 and stopping score propagation. Eventually, as shown by a grid graph 604, a trackback process (e.g., the method 500 of FIG. 5) can be performed on the grid graph 604 to determine a path trace back 628 (pattern filled grid cells), which can represent a route between the source pin and the target pin.

In comparison, a grid graph 632 application of an example traditional method routing based on a unit score U of 1, and a blocked score O of 90. As shown, the traditional method for routing performs 87 score propagations from the source grid cell 620 before reaching the target grid cell 624 and stopping score propagation. As shown by a grid graph 634, a trackback process can be performed on the grid graph 632 to determine a path trace back 630 (pattern filled grid cells), which can represent a route between the source pin and the target pin. Accordingly, the traditional method performed several more score propagations to reach the same route path as the method of routing according to some embodiments.

Figure 7:
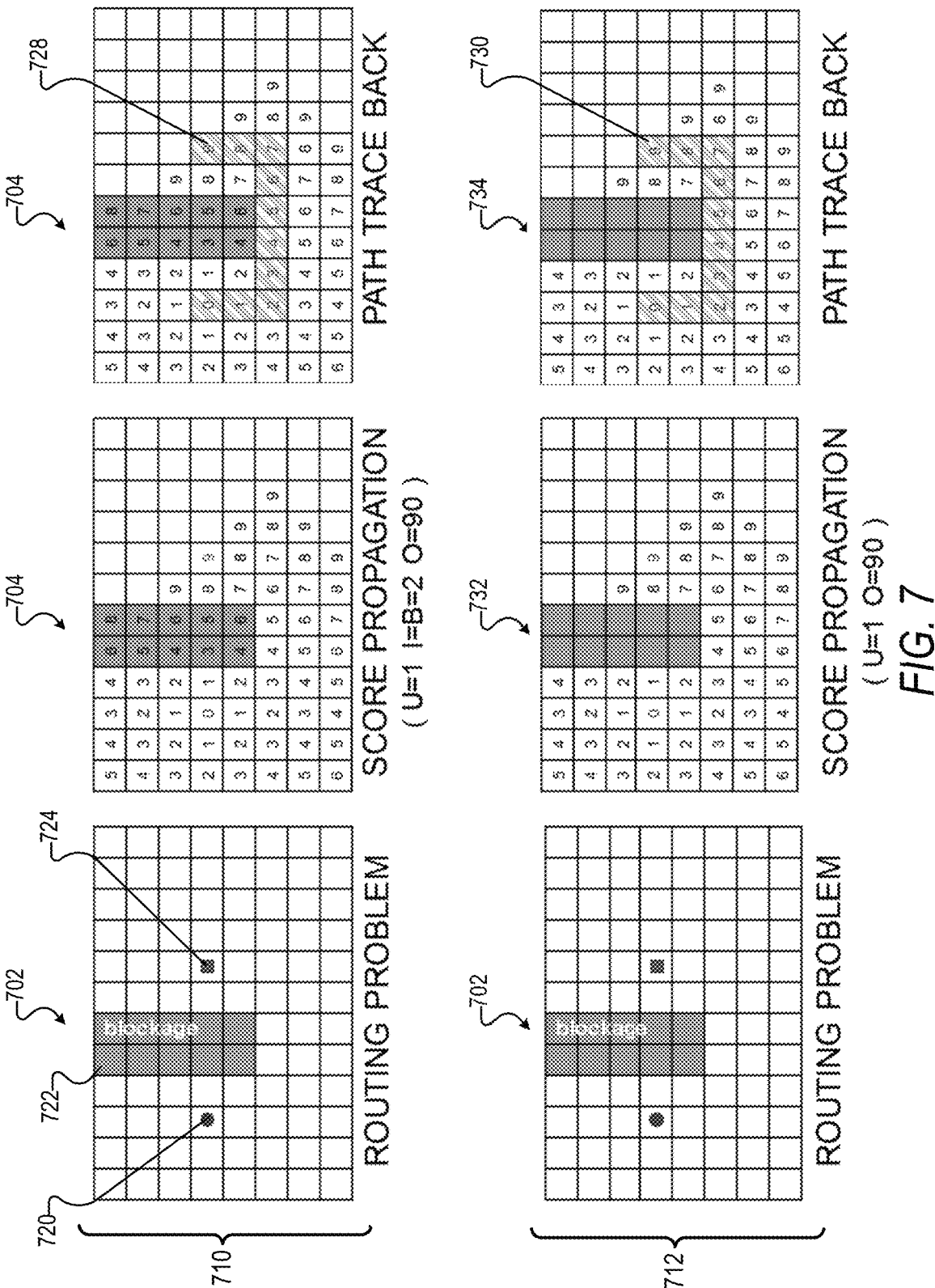

Referring now to FIG. 7, label 710 refers to application of a method for routing, according to some embodiments, to an example routing problem illustrated by grid graph 702. For the sake of comparison, label 712 refers to application of a traditional method of routing to the example routing problem illustrated by the grid graph 702. As shown, the grid graph 702 comprises a source grid cell 720 associated with a source pin of a network of a circuit design, a target grid cell 724 associated with a target pin of the network, and plurality of grid cells 722 associated with a routing blockage of the circuit design. The grid graph 702 represents the example routing problem for determining a route (e.g., a route path or a route solution) from the source grid cell 720 to the target grid cell 724, where both the source pin and the target pin are placed outside routing blockage but have routing blockage blocking a direct route between the two pins.

A grid graph 704 represents application of an example method of an embodiment based on a unit score U of 1, an inside-blockage score B of 2, and an exiting-blockage score O of 90. As shown, the method for routing (according to some embodiments) performs 63 score propagations from the source grid cell 720 before reaching the target grid cell 724 and stopping score propagation. Eventually, as shown by a grid graph 704, a trackback process (e.g., the method 500 of FIG. 5) can be performed on the grid graph 704 to determine a path trace back 728 (pattern filled grid cells), which can represent a route between the source pin and the target pin.

In comparison, a grid graph 732 application of an example traditional method routing based on a unit score U of 1, and a blocked score O of 90. As shown, the traditional method for routing performs 53 score propagations from the source grid cell 720 before reaching the target grid cell 724 and stopping score propagation. As shown by a grid graph 734, a trackback process can be performed on the grid graph 732 to determine a path trace back 730 (pattern filled grid cells), which can represent a route between the source pin and the target pin.

Figure 8:
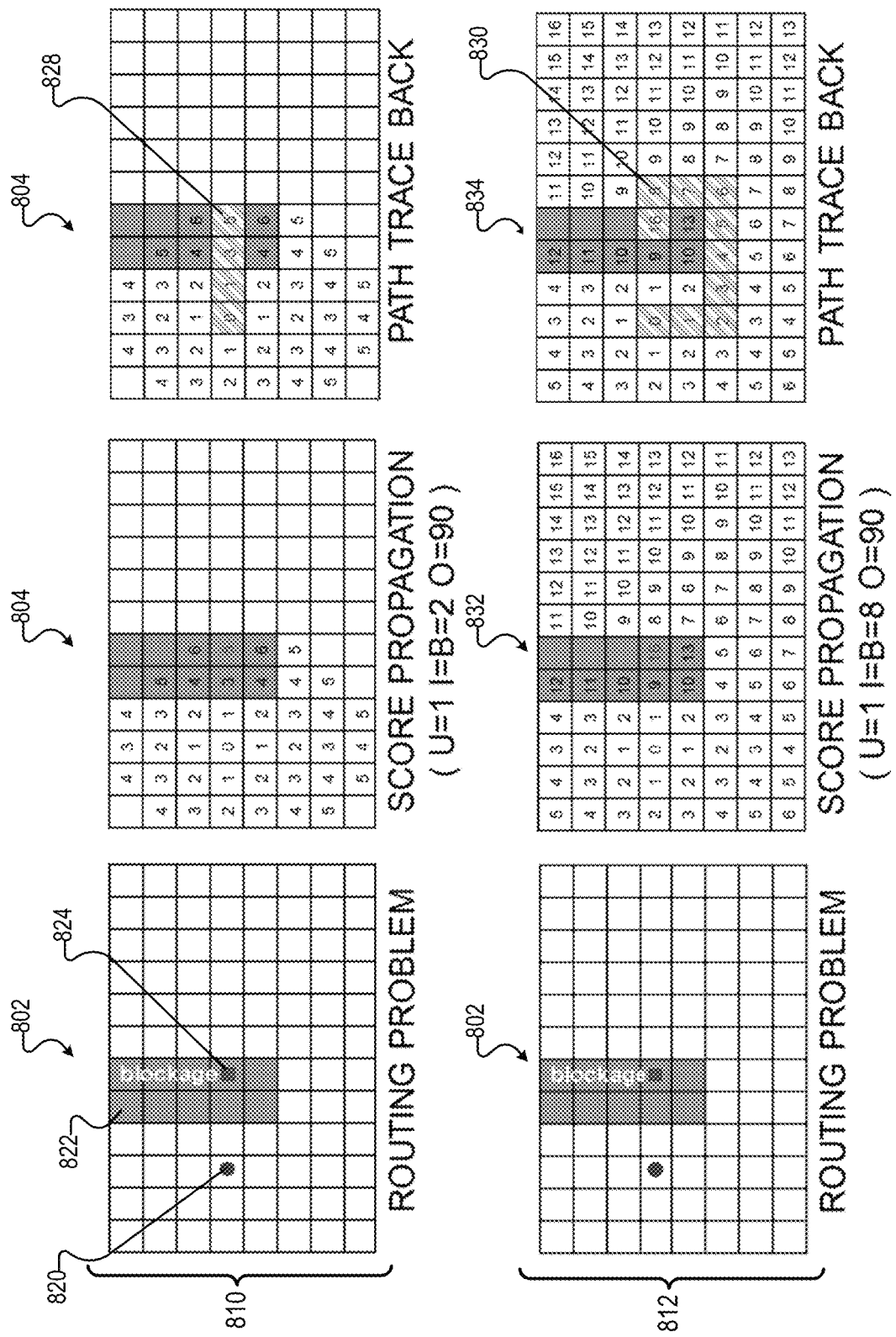

Referring now to FIG. 8, label 810 refers to application of a method for routing, according to some embodiments, to an example routing problem illustrated by grid graph 802. For the sake of comparison, label 812 refers to another application of a method for routing, according to some embodiments, to the example routing problem illustrated by the grid graph 802, where the score parameters used between the two applications are different. As described herein, adjusting or setting one or more of the scores described herein (e.g., a unit score U, an inside-routing-blockage score B, or an exiting-routing-blockage score O) can represent using a parameter that controls accuracy at which a routing process of various embodiments handles a pin (e.g., as placed by a placement stage) in routing blockage of the circuit design.

As shown, the grid graph 802 comprises a source grid cell 820 associated with a source pin of a network of a circuit design, a target grid cell 824 associated with a target pin of the network, and plurality of grid cells 822 associated with a routing blockage of the circuit design. The grid graph 802 represents the example routing problem for determining a route (e.g., a route path or a route solution) from the source grid cell 820 to the target grid cell 824, where the source pin is placed outside routing blockage and the target pin is placed inside routing blockage.

A grid graph 804 represents application of an example method of an embodiment based on a unit score U of 1, an inside-blockage score B of 2, and an exiting-blockage score O of 90. As shown, the method for routing (according to some embodiments) performs score propagations from the source grid cell 820 before reaching the target grid cell 824 and stopping score propagation. Eventually, as shown by a grid graph 804, a trackback process (e.g., the method 500 of FIG. 5) can be performed on the grid graph 804 to determine a path trace back 828 (pattern filled grid cells), which can represent a route between the source pin and the target pin.

Alternatively, a grid graph 832 represents application of an example method of an embodiment based on a unit score U of 1, an inside-blockage score B of 8, and an exiting-blockage score 0 of 90. As shown by a grid graph 834, a trackback process can be performed on the grid graph 832 to determine a path trace back 830 (pattern filled grid cells), which can represent a route between the source pin and the target pin. As also illustrated, in comparison to the application referenced by label 810, the application referenced by label 812 performs several more score propagations from the source grid cell 820 before reaching the target grid cell 824, but results in the track back path 830 that is different from the trace back path 828 (e.g., it is a longer trace back path but travels less in routing blockage).

Figure 9:
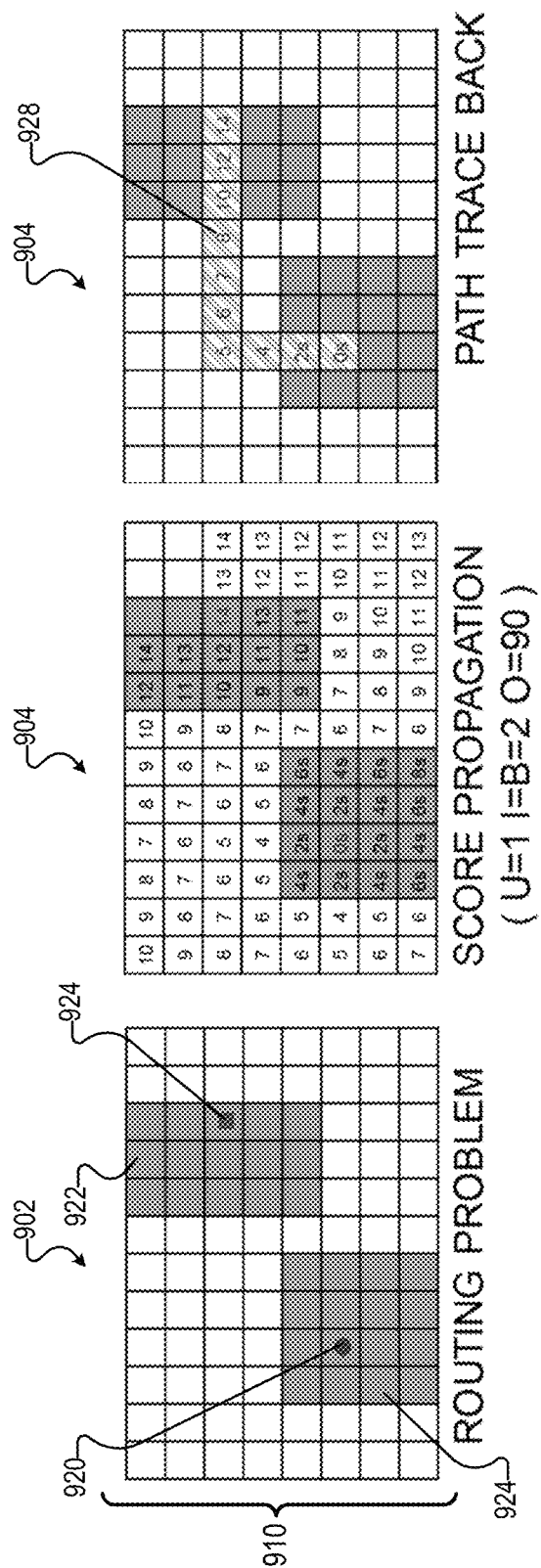

Referring now to FIG. 9, label 910 refers to application of a method for routing, according to some embodiments, to an example routing problem illustrated by grid graph 902. As shown, the grid graph 902 comprises a source grid cell 920 associated with a source pin of a network of a circuit design, a target grid cell 924 associated with a target pin of the network, a plurality of grid cells 922 associated with a routing blockage of the circuit design, and a plurality of grid cells 924 associated with another routing blockage of the circuit design. The grid graph 902 represents the example routing problem for determining a route (e.g., a route path or a route solution) from the source grid cell 920 to the target grid cell 924, where both the source pin and the target pin are placed inside routing blockage.

A grid graph 904 represents application of an example method of an embodiment based on a unit score U of 1, an inside-blockage score B of 2, and an exiting-blockage score O of 90. As shown, the method for routing (according to some embodiments) uses a special label (e.g., special label s) for score propagation (from the source grid) within the plurality of grid cells 924, and stops using the special label once score propagation exits the other routing blockage associated with the plurality of grid cells 924. Eventually, as shown by a grid graph 904, a trackback process (e.g., the method 500 of FIG. 5) can be performed on the grid graph 804 to determine a path trace back 928 (pattern filled grid cells), which can represent a route between the source pin and the target pin.

Figure 10:
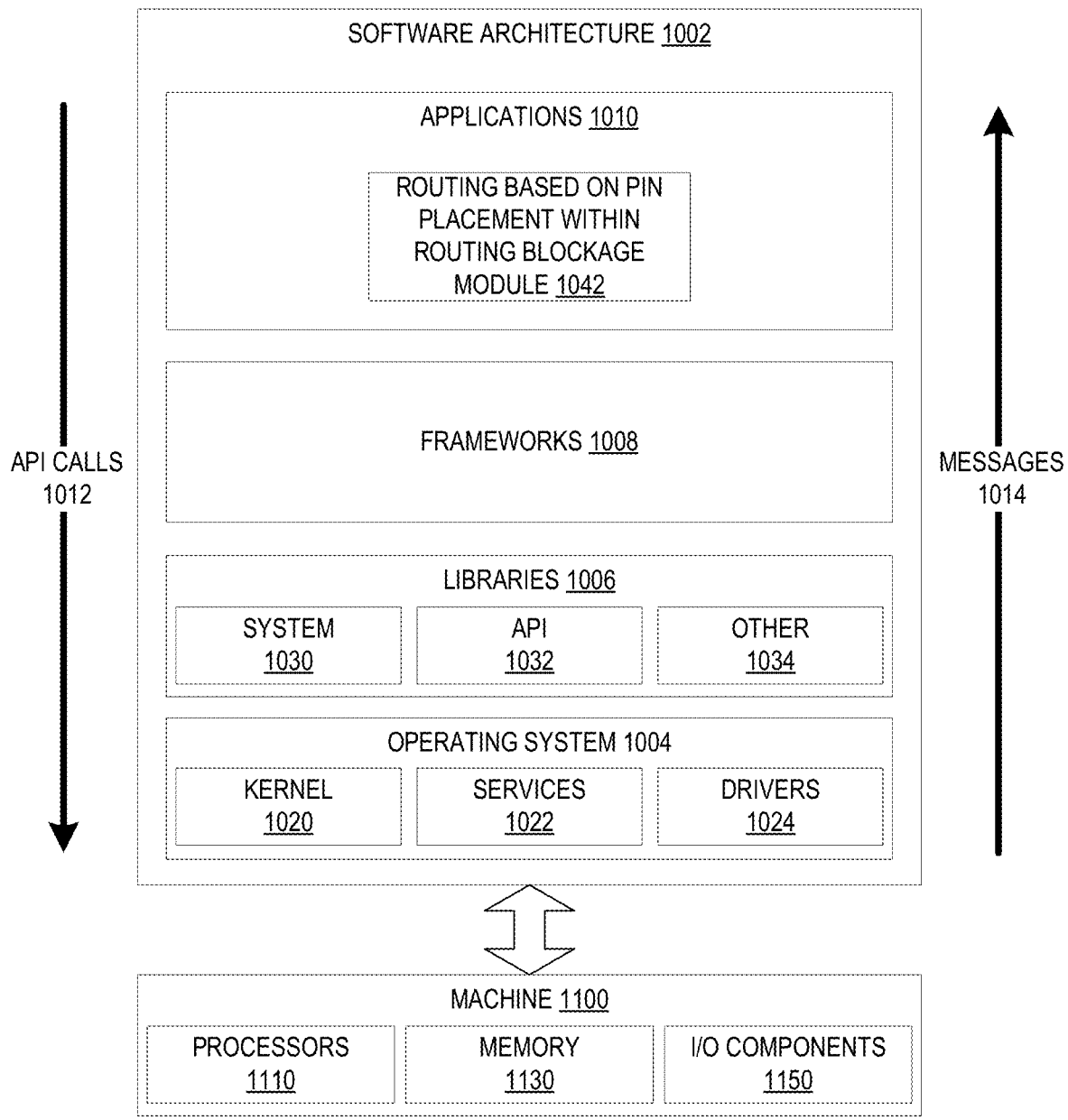
FIG. 10 is a block diagram illustrating an example of a software architecture that may be operating on an EDA computing device and may be used with methods for routing of wires of a network of a circuit design based on pin placement within a routing blockage, according to some embodiments.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 of FIG. 11 that includes processors 1110 (e.g., hardware processors), memory 1130, and input/output (I/O) components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, any server computer of a server system, or any other device described herein may operate using elements of the software architecture 1002. An EDA computing device described herein may additionally be implemented using aspects of the software architecture 1002, with the software architecture 1002 adapted for operating to routing in any manner described herein.

In some embodiments, an EDA application of the applications 1010 performs routing of wires of a network of a circuit design based on pin placement within a routing blockage according to embodiments described herein using various modules within the software architecture 1002. For example, in some embodiments, an EDA computing device similar to the machine 1100 includes the memory 1130 and the one or more processors 1110. The processors 1110 also implement a routing based on pin placement within routing blockage module 1042 (hereafter, the routing blockage module 1042) for routing based on pin placement within a routing blockage, in accordance with various embodiments described herein.

In various other embodiments, rather than being implemented as modules of the one or more applications 1010, the routing blockage module 1042 may be implemented using elements of the libraries 1006, the operating system 1004, or the software frameworks 1008.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement routing of wires of a network of a circuit design based on pin placement within a routing blockage as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose hardware processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors 1110 that are temporarily configured (e.g., by software) or permanently configured to perform the relevant operations. Whether temporarily or permanently configured, such processors 1110 constitute processor-implemented modules that operate to perform one or more operations or functions described herein. As used herein, "processor-implemented module" refers to a hardware module implemented using one or more processors 1110.

Similarly, the methods described herein can be at least partially processor-implemented, with a particular processor or processors 1110 being an example of hardware. For example, at least some of the operations of a method can be performed by one or more processors 1110 or processor-implemented modules. Moreover, the one or more processors 1110 may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors 1110, not only residing within a single machine 1100, but deployed across a number of machines 1100. In some embodiments, the processors 1110 or processor-implemented modules are located in a single geographic location (e.g., within a home environment, an office environment, or a server farm). In some other embodiments, the processors 1110 or processor-implemented modules are distributed across a number of geographic locations.

Figure 11:
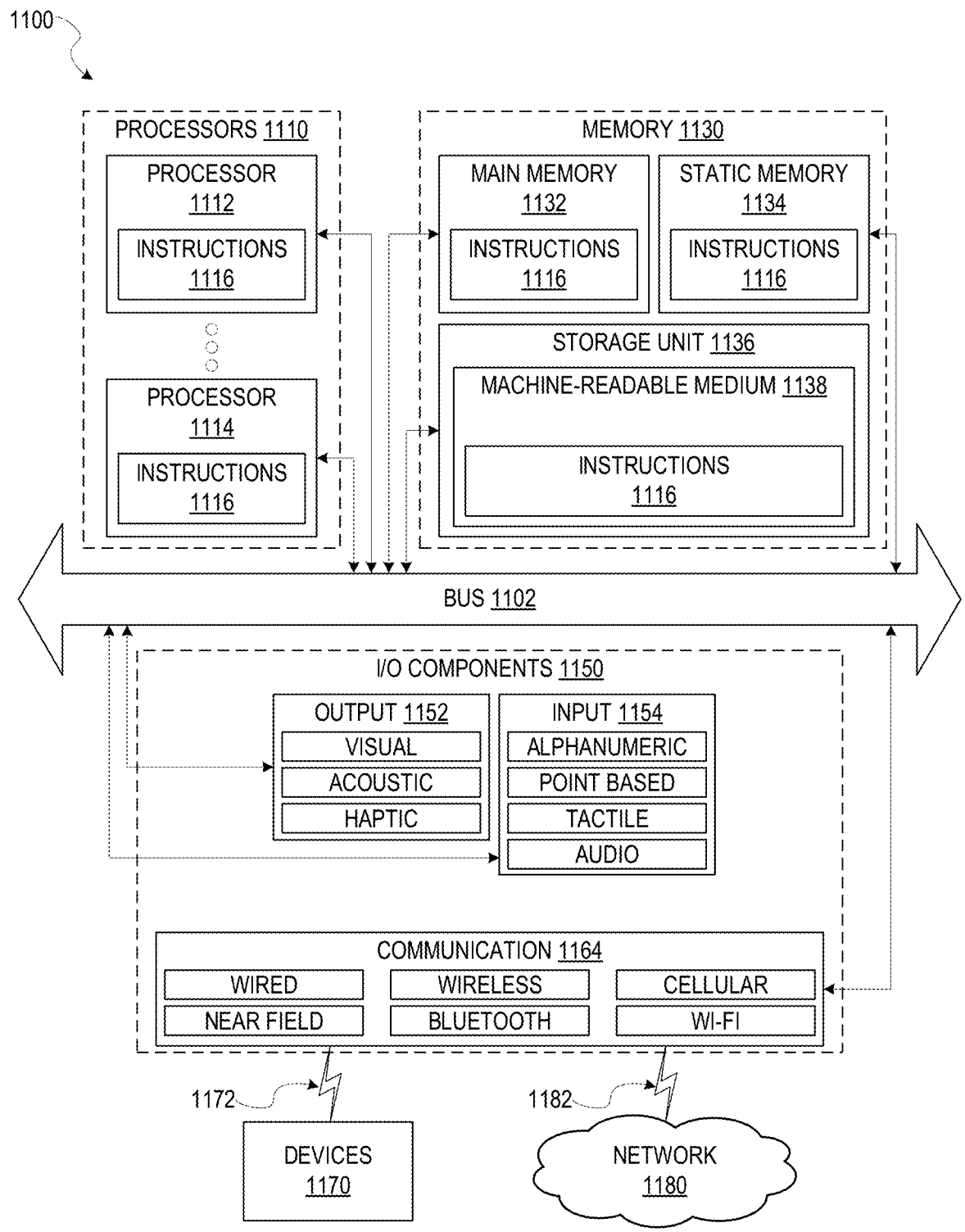
FIG. 11 is a diagram representing a machine in the form of a computer system within which a set of instructions are executed, causing the machine to perform any one or more of the methods discussed herein, according to some embodiments.

FIG. 11 is a diagrammatic representation of the machine 1100 in the form of a computer system within which a set of instructions may be executed for causing the machine 1100 to perform any one or more of the methodologies discussed herein, according to some embodiments. FIG. 11 shows components of the machine 1100, which is, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In some embodiments, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in some embodiments, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions 1116, when executed by one or more processors of the machine 1100 (e.g., the processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

In various embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions 1016, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
    generating, by a hardware processor, a grid graph of a circuit design, the grid graph comprising a plurality of grid cells, a source grid cell of the plurality of grid cells being associated with a source pin of a network of the circuit design, and a target grid cell of the plurality of grid cells being associated with a target pin of the network;
    determining, by the hardware processor, whether the source grid cell is disposed within routing blockage of the circuit design;
    setting, by the hardware processor, a score of the source grid cell to a start value based on the determining whether the source grid cell is disposed within routing blockage of the circuit design;
    generating, by the hardware processor, a scored grid graph by performing maze routing on the grid graph starting from the source grid cell to the target grid cell, the maze routing comprising:
        determining whether a grid edge from a current parent grid cell to a neighboring grid cell is at least one of outside routing blockage of the circuit design, inside routing blockage of the circuit design, or exiting routing blockage of the circuit design; and
        setting a score of the neighboring grid cell based on the determining whether the grid edge from the current parent grid cell to the neighboring grid cell is at least one of outside routing blockage of the circuit design, inside routing blockage of the circuit design, or exiting routing blockage of the circuit design; and
    determining a route from the source pin to the target pin by performing a path trace back based on the scored grid graph.

2. The method of claim 1, wherein the setting the score of the source grid cell to the start value based on the determining whether the source grid cell is disposed within routing blockage of the circuit design comprises:
    in response to determining that the source grid cell is disposed within routing blockage of the circuit design, setting the score of the source grid cell to a numerical value with a special label.

3. The method of claim 1, wherein the setting the score of the source grid cell to the start value based on the determining whether the source grid cell is disposed within routing blockage of the circuit design comprises:
    in response to determining that the source grid cell is not disposed within routing blockage of the circuit design, setting the score of the source grid cell to a numerical value without a special label.

4. The method of claim 1, wherein the setting the score of the neighboring grid cell based on the determining whether a grid edge from a current parent grid cell to a neighboring grid cell is at least one of outside routing blockage of the circuit design, inside routing blockage of the circuit design, or exiting routing blockage of the circuit design comprises:
    setting a score of a neighboring grid cell based on a first score in response to determining that the grid edge is outside routing blockage of the circuit design;

setting the score of the neighboring grid cell based on a second score in response to determining that the grid edge is inside routing blockage of the circuit design; and in response to determining that the grid edge is exiting routing blockage of the circuit design:
determining whether a score of the current parent grid cell comprises a special label; and
setting, based on the determining whether the score of the current parent grid cell comprises the special label, the score of a neighboring grid cell based on at least one of the second score or a third score.

5. The method of claim 4, wherein the third score is greater than the second score, and the second score is greater than the first score.

6. The method of claim 4, wherein the setting, based on the determining whether the score of the current parent grid cell comprises the special label, the score of the neighboring grid cell based on at least one of the second score or the third score comprises:
in response to determining that the score of the current parent grid cell comprises the special label, setting the score of the neighboring grid cell based on the second score.

7. The method of claim 4, wherein the setting, based on the determining whether the score of the current parent grid cell comprises the special label, the score of the neighboring grid cell based on at least one of the second score or the third score comprises:
in response to determining that the score of the current parent grid cell does not comprise the special label, setting the score of the neighboring grid cell based on the third score.

8. The method of claim 4, wherein the setting the score of the neighboring grid cell based on the first score comprises:
setting the score of the neighboring grid cell based on the first score and the score of the current parent grid cell.

9. The method of claim 4, wherein the setting the score of the neighboring grid cell based on the second score comprises:
setting the score of the neighboring grid cell based on the second score and the score of the current parent grid cell.

10. The method of claim 4, wherein the setting the score of the neighboring grid cell based on the third score comprises:
setting the score of the neighboring grid cell based on the third score and the score of the current parent grid cell.

11. The method of claim 1, wherein the start value comprises a zero value.

12. The method of claim 1, further comprising:
setting, by the hardware processor, a score of any grid cell that is not the source grid cell to a value representing infinity.

13. A device comprising:
a memory storing instructions; and
a hardware processor communicatively coupled to the memory and configured by the instructions to perform operations comprising:
generating a grid graph of a circuit design, the grid graph comprising a plurality of grid cells, a source grid cell of the plurality of grid cells being associated with a source pin of a network of the circuit design, and a target grid cell of the plurality of grid cells being associated with a target pin of the network;
determining whether the source grid cell is disposed within routing blockage of the circuit design;

setting a score of the source grid cell to a start value based on the determining whether the source grid cell is disposed within routing blockage of the circuit design;
generating a scored grid graph by performing maze routing on the grid graph starting from the source grid cell to the target grid cell, the maze routing comprising:
determining whether a grid edge from a current parent grid cell to a neighboring grid cell is at least one of outside routing blockage of the circuit design, inside routing blockage of the circuit design, or exiting routing blockage of the circuit design; and
setting a score of the neighboring grid cell based on the determining whether the grid edge from the current parent grid cell to the neighboring grid cell is at least one of outside routing blockage of the circuit design, inside routing blockage of the circuit design, or exiting routing blockage of the circuit design; and
determining a route from the source pin to the target pin by performing a path trace back based on the scored grid graph.

14. The device of claim 13, wherein the setting the score of the source grid cell to the start value based on the determining whether the source grid cell is disposed within routing blockage of the circuit design comprises:
in response to determining that the source grid cell is disposed within routing blockage of the circuit design, setting the score of the source grid cell to a numerical value with a special label.

15. The device of claim 13, wherein the setting the score of the source grid cell to the start value based on the determining whether the source grid cell is disposed within routing blockage of the circuit design comprises:
in response to determining that the source grid cell is not disposed within routing blockage of the circuit design, setting the score of the source grid cell to a numerical value without a special label.

16. The device of claim 13, wherein the setting the score of the neighboring grid cell based on the determining whether a grid edge from a current parent grid cell to a neighboring grid cell is at least one of outside routing blockage of the circuit design, inside routing blockage of the circuit design, or exiting routing blockage of the circuit design comprises:
setting a score of a neighboring grid cell based on a first score in response to determining that the grid edge is outside routing blockage of the circuit design;
setting the score of the neighboring grid cell based on a second score in response to determining that the grid edge is inside routing blockage of the circuit design; and
in response to determining that the grid edge is exiting routing blockage of the circuit design:
determining whether a score of the current parent grid cell comprises a special label; and
setting, based on the determining whether the score of the current parent grid cell comprises the special label, the score of a neighboring grid cell based on at least one of the second score or a third score.

17. The device of claim 16, wherein the third score is greater than the second score, and the second score is greater than the first score.

18. The device of claim 13, wherein the start value comprises a zero value.

19. The device of claim 13, further comprising:
setting a score of any grid cell that is not the source grid cell to a value representing infinity.

20. A non-transitory computer-readable medium comprising instructions that, when executed by a hardware processor of a device, cause the device to perform operations comprising:
determining whether a source grid cell, of a plurality of grid cells of a grid graph of a circuit design, is disposed within routing blockage of the circuit design, the source grid cell being associated with a source pin of the circuit design, and a target grid cell of the plurality of grid cells of the circuit design being associated with a target pin of the circuit design;
setting a score of the source grid cell to a start value based on the determining whether the source grid cell is disposed within routing blockage of the circuit design; and
generating a scored grid graph by performing maze routing on the grid graph starting from the source grid cell to the target grid cell, the maze routing comprising:
determining whether a grid edge from a current parent grid cell to a neighboring grid cell is at least one of outside routing blockage of the circuit design, inside routing blockage of the circuit design, or exiting routing blockage of the circuit design; and
setting a score of the neighboring grid cell based on the determining whether the grid edge from the current parent grid cell to the neighboring grid cell is at least one of outside routing blockage of the circuit design, inside routing blockage of the circuit design, or exiting routing blockage of the circuit design.

* * * * *